Patented Dec. 11, 1928.

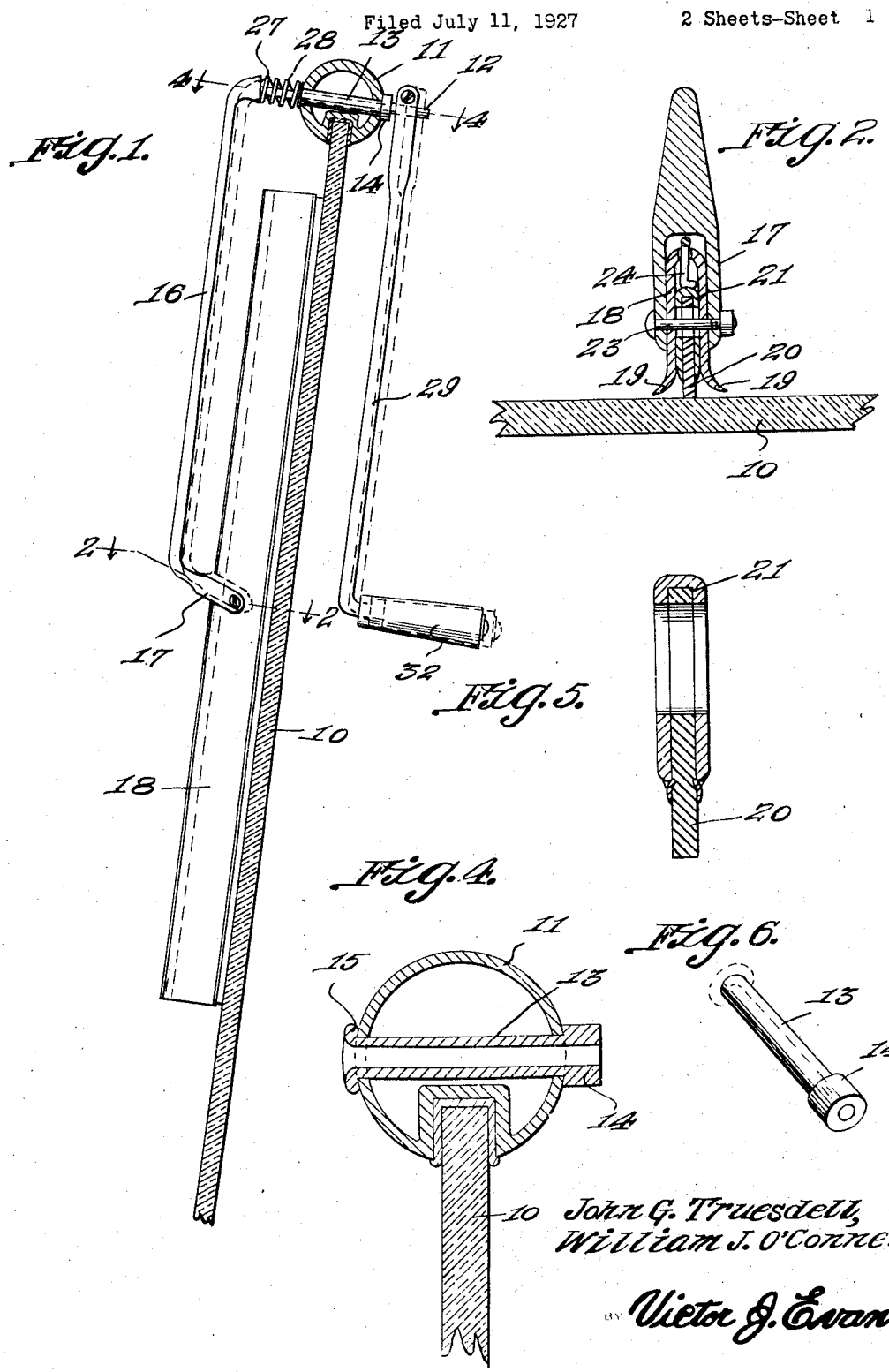

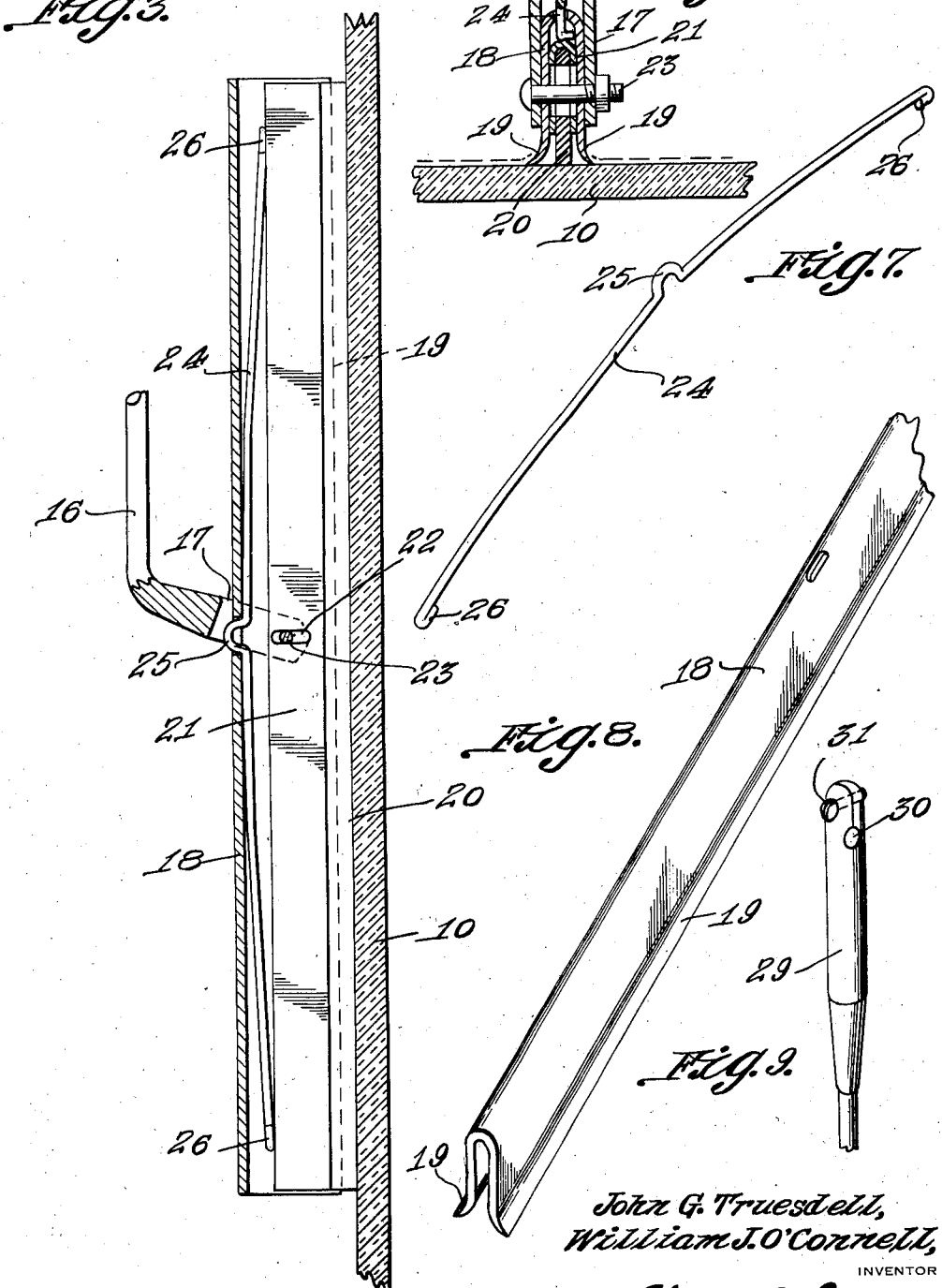

1,695,163

UNITED STATES PATENT OFFICE.

JOHN G. TRUESDELL AND WILLIAM J. O'CONNELL, OF COLORADO SPRINGS, COLORADO.

WINDSHIELD CLEANER.

Application filed July 11, 1927. Serial No. 204,963.

This invention relates to improvements in windshield cleaners and has for its primary object the provision of a cleaner which may be operated to wipe the windshield after the manner of the ordinary cleaner or wiper, and which in addition, may be operated to scrape the windshield for the purpose of removing snow and ice.

Another object of the invention is the provision of a windshield cleaner which includes a rubber or other flexible wiping strip and a holder or carrier therefor, the said holder or carrier being utilized to provide a scraper, so that both a wiping or scraping action may be obtained without materially increasing the cost of manufacture.

Another object of the invention is the provision of a cleaner in which the wiper is yieldingly forced into contact with the windshield, the forcing means being such as to insure even contact with the windshield throughout the length of the wiper.

With the above and other objects in view, the invention further includes the following novel features and details of construction, to be hereinafter more fully described, illustrated in the accompanying drawings and pointed out in the appended claim.

In the drawings:—

Figure 1 is a sectional view through a portion of a windshield with the invention applied.

Figure 2 is an enlarged fragmentary section on the line 2—2 of Figure 1.

Figure 3 is an enlarged sectional view, the section being taken longitudinally of the cleaner.

Figure 4 is an enlarged fragmentary section through a portion of the windshield and illustrating the bearing for the operating shaft.

Figure 5 is a fragmentary section taken transversely through the wiper.

Figure 6 is a detail perspective view of the bearing for the operating shaft.

Figure 7 is a like view of the wiper spring.

Figure 8 is a fragmentary view of the holder or carrier.

Figure 9 is a fragmentary perspective view showing a portion of the operating handle.

Figure 10 is a view similar to Figure 2 but showing the scraper in contact with the windshield.

Referring to the drawings in detail wherein like characters of reference denote corresponding parts, the reference character 10 indicates a portion of a windshield and 11 a portion of the frame. The cleaner which comprises the present invention includes an operating shaft 12 which is journaled in a bearing sleeve 13, the latter extending transversely through the windshield frame 11. This bearing sleeve is shown in detail in Figure 6 of the drawings and is provided at one end with an enlarged portion or shoulder 14 which engages the frame, while the opposite end of the bearing sleeve is preferably upset as shown at 15 after the sleeve has been inserted through the frame.

The shaft 12 has extending therefrom an arm 16 and the outer end of this arm is bifurcated to provide spaced ears 17. Pivotally mounted between these ears is a holder or carrier 18. This holder or carrier is transversely U shaped in cross section and has its longitudinal edges oppositely and outwardly flared to provide scraper edges 19. These edges are adapted to engage the windshield for the purpose of scraping snow or ice therefrom, as will be later explained.

The wiping element comprises a flexible strip 20 which is preferably formed of rubber and which is secured within a metallic holder 21. This holder has a working fit within the carrier 18 and is provided with a transversely disposed elongated slot 22 which receives a pin 23. This pin is carried by the ears 17 and extends through these ears and through the carrier, so that the wiper 20 may be moved pivotally and transversely within the carrier. Positioned within the carrier and bearing against the inner edge of the holder 21 is a spring 24. This spring is provided with a loop 25 which extends through the carrier 18. The opposite ends of the spring 24 are inturned as shown at 26 so as to provide a relatively broad bearing surface for contact with the rear edge of the wiper. This will prevent the ends of the spring from slipping and wedging between the wiper and the inner walls of the carrier. By mounting the wiper in the manner described, an even contact with the windshield is provided throughout the length of the wiper.

The juncture of the arm 16 with the shaft 12 is provided with a shoulder 27 and mounted upon this shaft between this shoulder and the frame 11 is a coiled spring 28. The function of this spring is to force the shaft 12 outward so that the carrier 18 is normally spaced from the windshield, the spring 24 forcing the wiper into contact with the windshield.

Secured upon the inner end of the shaft 12 is an operating handle 29. One end of this handle is bifurcated and provided with an opening 30 which receives the shaft 12, the handle being clamped upon the shaft by means of a set screw 31. The handle is provided with a grip or finger piece 32 by means of which the cleaner may be conveniently manipulated. In the use of the cleaner, the handle is operated in the usual manner so as to swing the wiper across the windshield. When it is desired to remove snow or ice, the handle is drawn inward or toward the operator so that the parts will keep the position shown by the dotted lines in Figure 1. This will bring the scraping edges 19 of the carrier into contact with the glass as shown in Figure 10 of the drawings, so that when the handle is manipulated, snow and ice will be effectually removed by the action of the scraping edges and the wiper. Upon release of the handle, the spring 28 will return the parts to their normal positions.

The invention is susceptible of various changes in its form, proportions and minor details of construction and the right is herein reserved to make such changes as properly fall within the scope of the appended claim.

Having described the invention what is claimed is:—

A windshield cleaner comprising a carrier arranged upon one side of a windshield, a wiping element movable within the carrier and engaging the windshield, scraper elements secured to the carrier upon opposite sides of the wiping element and normally spaced from the windshield, a shaft mounted for rocking and axial movement in the frame of the windshield, an arm extending from one end of the shaft and having its outer end positively pivoted to the carrier and slidingly connected with the wiping element, an operating handle secured to the other end of the shaft and means to force the shaft in a direction to space the scraper elements from the windshield.

In testimony whereof we affix our signatures.

JOHN G. TRUESDELL.
WILLIAM J. O'CONNELL.